United States Patent
Zhou et al.

(10) Patent No.: US 7,353,165 B2
(45) Date of Patent: Apr. 1, 2008

(54) EXAMPLE BASED MACHINE TRANSLATION SYSTEM

(75) Inventors: Ming Zhou, Beijing (CN); Jin-Xia Huang, Beijing (CN); Chang Ning (Tom) Huang, Beijing (CN); Wei Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1055 days.

(21) Appl. No.: 10/185,376

(22) Filed: Jun. 28, 2002

(65) Prior Publication Data

US 2004/0002848 A1 Jan. 1, 2004

(51) Int. Cl.
G06F 17/28 (2006.01)
(52) U.S. Cl. .................... 704/5; 704/2; 704/4
(58) Field of Classification Search ............ 704/2, 704/1, 4–5
See application file for complete search history.

(56) References Cited

U.S. PATENT DOCUMENTS

| | | | | |
|---|---|---|---|---|
| 5,541,836 | A * | 7/1996 | Church et al. ................. | 704/7 |
| 5,659,765 | A * | 8/1997 | Nii .............................. | 704/4 |
| 6,195,631 | B1 * | 2/2001 | Alshawi et al. ............... | 704/4 |
| 6,330,530 | B1 * | 12/2001 | Horiguchi et al. ............ | 704/4 |
| 6,631,346 | B1 * | 10/2003 | Karaorman et al. .......... | 704/9 |
| 6,772,180 | B1 * | 8/2004 | Li et al. ..................... | 715/513 |
| 2002/0138250 | A1 * | 9/2002 | Okura et al. .................. | 704/2 |
| 2002/0143537 | A1 * | 10/2002 | Ozawa et al. ............... | 704/254 |
| 2002/0188439 | A1 * | 12/2002 | Marcu .......................... | 704/5 |

OTHER PUBLICATIONS

Fung et al. "An IR approach for translating new words from nonparallel, comparable texts". In: Proceedings of COLING-ACL 1998, Montreal, vol. 1, 1998, pp. 414-420.*
Nakagawa. "Disambiguation of Single Noun Translation Extracted from Bilingual Comparable Corpora". Terminology, 7:1, 2001, pp. 63-83.*
Kikui. "Resolving Translation Ambiguity using Nonparallel Bilingual Corpora". In Workshop on Unsupervised Learning in Natural Language Processing, College Park, MD, 1999, pp. 31-36.*
Iiyas Cicekli, H. Altay Guvenir "Learning Translation templates from Bilingual Translation Examples" Applied Intelligence vol. 15, (1), 2001, p. 57-76.
Girshman, R. "Iterative Alignment of Syntactic Structures For a Bilingual Corpus" Proc. 2nd Workshop for Very Large Corpora 1994, p. 57-68.
Ido, D., et al., Robust Bilingual Word Alignment for Machine-Aided Translation, ANLP-'94, p. 34-40.

(Continued)

Primary Examiner—Patrick N. Edouard
Assistant Examiner—James S. Wozniak
(74) Attorney, Agent, or Firm—Joseph R. Kelly; Westman, Champlin & Kelly, P.A.

(57) ABSTRACT

The present invention performs machine translation by matching fragments of a source language sentence to be translated to source language portions of an example in example base. When all relevant examples have been identified in the example base, the examples are subjected to phrase alignment in which fragments of the target language sentence in each example are aligned against the matched fragments of the source language sentence in the same example. A translation component then substitutes the aligned target language phrases from the matched examples for the matched fragments in the source language sentence.

21 Claims, 10 Drawing Sheets

OTHER PUBLICATIONS

Kaji, H., Kada Y., et al. Learning Translation Templates from Bilingual Text, in Proceedings of COLING-92, 1992, pp. 672-678.

Sue J. Ker and Jason S. Chang, A Class-based Approach to Word Alignment, Computational Linguistics, Nov. 23, No. 2, pp. 313-343, Jun. 1997.

McTait, K. & A. Trujillo (1999) A Language-Neutral Sparse-Data Algorithm for Extracting Translation Patterns. Proceedings of the 8th International Conference on Theoretical and Methodological Issues in Machine Translation, TMI-99, Chester, UK, 98-108.

Meyers, A., R. Yangarber and R. Girshman: 1996, Alignment of Shared Forests for Bilingual Corpora, in Coling (1996) pp. 459-465.

Watanabe, H. 2000, Finding Structural Correspondences from Bilingual Parsed Corpus for Corpus-Based Translation, COLING, pp. 906-912, Saarbruecken.

Dekai Wu "An Algorithm for Simultaneously Bracketing Parallel Texts by Aligning Words" ACL-95, 1995, p. 244-251.

Wu, Dekai. "Grammarless Extraction of Phrasal Translation Examples From Parallel Texts". TMI-95, Sixth International Conference on Theoretical and Methodological Issues in Machine Translation, v2, 354-372, Leuven, Belgium: Jul. 1995.

Japanese Application No. 2003-185956, Official Notice of Rejection dated Nov. 2, 2007.

* cited by examiner

INPUT SENTENCE:  TERM 1  TERM 2  TERM 3  TERM 4  TERM 5  TERM 6  TERM 7
                                 [bi-term 3-4    ]
                                          [bi-term 4-5     ]
                                                   [bi-term 5-6    ]
                                                            [bi-term 6-7    ]

EXAMPLE 1:                       [block 3-7                                 ]
EXAMPLE 2:                       [block 3-5              ]
EXAMPLE 3:                                        [block 5-7                ]
EXAMPLE 4:                                [block 4-5      ]
EXAMPLE 5:                                                 [block 6-7       ]

FIG. 5

EXAMPLE BASED MACHINE TRANSLATION SYSTEM

BACKGROUND OF THE INVENTION

The present invention relates to machine translation. More specifically, the present invention relates to an example based machine translation system or translation memory system.

Machine translation is a process by which an input sentence (or sentence fragment) in a source language is provided to a machine translation system. The machine translation system outputs one or more translations of the source language input as a target language sentence, or sentence fragment. There are a number of different types of machine translation systems, including example based machine translation (EBMT) systems.

EBMT systems generally perform two fundamental operations in performing a translation. Those operations include matching and transfer. The matching operation retrieves a "closest match" for a source language input string from an example database. The transfer operation generates a translation in terms of the matched example(s). Specifically, the transfer operation is actually the process of getting the translation of the input string by performing alignment between the matched bilingual example (s). "Alignment" as used herein means deciding which fragment in a target language sentence (or example) corresponds to the fragment in the source language sentence being translated.

Some EBMT systems perform similarity matching based on syntactic structures, such as parse trees or logical forms. Of course, these systems require the inputs to be parsed to obtain the syntactic structure. This type of matching method can make suitable use of examples and enhance the coverage of the example base. However, these types of systems run into trouble in certain domains, such as software localization. In software localization, software documentation and code are localized or translated into different languages. The terms used in software manuals render the parsing accuracy of conventional EBMT systems very low, because even the shallow syntax information (such as word segmentation and part-of-speech tags) is often erroneous.

Also, such systems have high example base maintenance costs. This is because all of the examples saved in the example base should be parsed and corrected by humans whenever the example base needs to be updated.

Other EBMT systems and translation memory systems employ string matching. In these types of systems, example matching is typically performed by using a similarity metric which is normally the edit distance between the input fragment and the example. However, the edit distance metric only provides a good indication of matching accuracy when a complete sentence or a complete sentence segment has been matched.

A variety of different alignment techniques have been used in the past as well, particularly for phrase alignments. Most of the previous alignment techniques can be classified into one of two different categories. Structural methods find correspondences between source and target language sentences or fragments with the help of parsers. Again, the source and target language fragments are parsed to obtain paired parses. Structural correspondences are then found based on the structural constraints of the paired parse trees. As discussed above, parsers present difficult problems in certain domains such as technical domains.

In grammarless alignment systems, correspondences are found not by using a parser, but by utilizing co-occurrence information and geometric information. Co-occurrence information is obtained by examining whether there are co-occurrences of source language fragments and target language fragments in a corpus. Geometric information is used to constrain the alignment space. The correspondences located are grammarless. Once the word correspondences are extracted, they are stored in an example base. This means that there is a source language sentence, and the correspondent target language sentence, and the word correspondence information will be saved in the example base. During translation, an example in the example base will be stimulated only if there is a fragment in the source language side of the example matching the input string.

SUMMARY OF THE INVENTION

The present invention performs machine translation by matching fragments of a source language input to portions of examples in an example base. All relevant examples are identified in the example base, in which fragments of the target language sentence are aligned against fragments of the source language sentence within each example. A translation component then substitutes the aligned target language phrases from the examples for the matched fragments in the source language input.

In one embodiment, example matching is performed based on position marked term frequency/inverted document frequency index scores. TF/IDF weights are calculated for blocks in the source language input that are covered by the examples to find a best block combination. The best examples for each block in the block combination are also found by calculating a TF/IDF weight.

In one embodiment, the relevant examples once identified are provided to an alignment component. The alignment component first performs word alignment to obtain alignment anchor points between the source language sentence and the target language sentence in the example pair under consideration. Then, all continuous alignments between the source language sentence and the target language sentence are generated, as are all non-continuous alignments. Scores are calculated for each alignment and the best are chosen as the translation.

In accordance with another embodiment of the invention, a confidence metric is calculated for the translation output. The confidence metric is used to highlight portions of the translation output which need user's attention. This draws the user's attention to such areas for possible modification.

BRIEF DESCRIPTION OF THE DRAWINGS

FIG. 5 illustrates a plurality of different examples corresponding to an input sentence in accordance with one embodiment of the present invention.

DETAILED DESCRIPTION OF ILLUSTRATIVE EMBODIMENTS

The present invention involves a machine translation system. However, before describing the present invention in greater detail, one embodiment of an environment in which the present invention can be used will be described.

Figure 1:
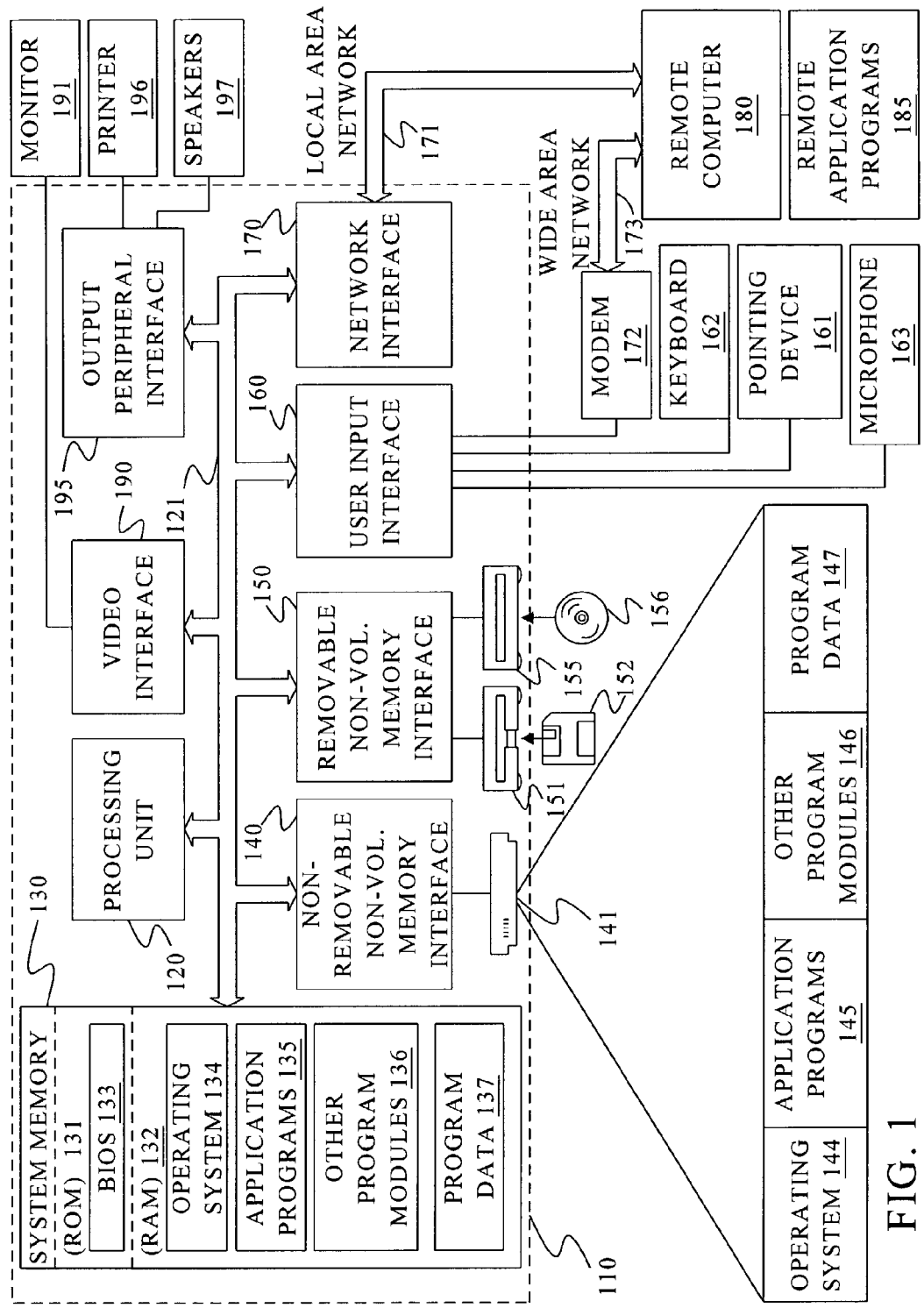
FIG. 1 is a block diagram of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
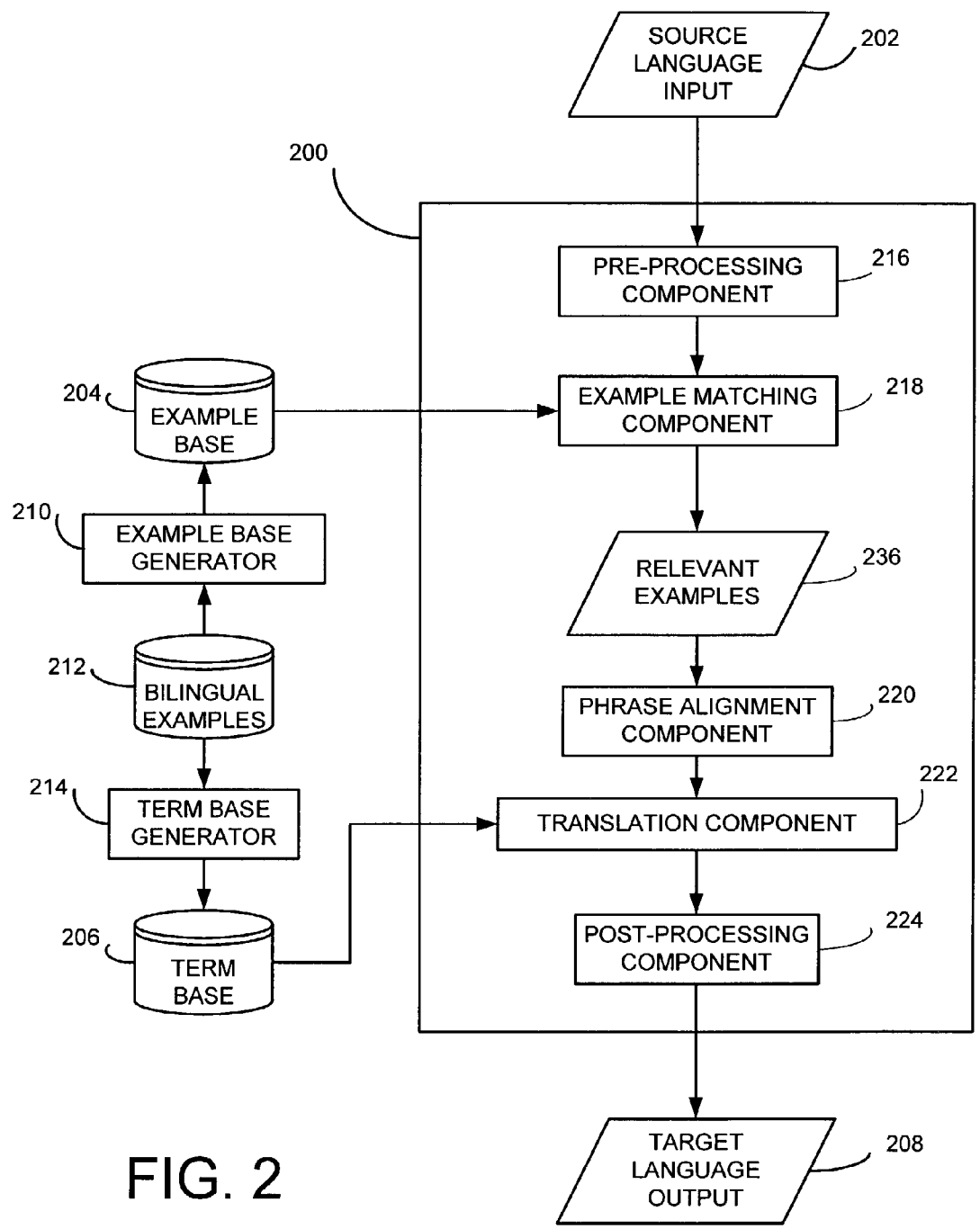
FIG. 2 is a block diagram of a translation engine in accordance with one embodiment of the present invention.

FIG. 2 is a block diagram of a translation engine 200 in accordance with one embodiment of the present invention. Translation engine 200 receives an input sentence (or sentence fragment) in a source language as source language input 202. Engine 200 then accesses example base 204 and term base 206 and generates a target language output 208. Target language output 208 is illustratively a translation of source language input 202 into the target language.

Example base 204 is a database of word aligned target language and source language examples generated from example base generator 210 based on a sentence aligned bilingual corpus of examples 212. Aligned bilingual corpus of examples 212 illustratively contains paired sentences (sentences in the source language aligned or paired with translations of those sentences in the target language). Example base generator 210 generates example base 204 indexed in what is referred to as position-marked term frequency/inverse document frequency (P-TF/IDF) indexing.

TF/IDF is a mature information retrieval technique and is a type of word indexing that is used to enable efficient document retrieval. A TF/IDF weight (or score) is calculated for each term (such as a lemma, or a term with a part-of-speech (POS) tag) in an index file. The higher the TF/IDF weight, the more important a term is. The TF/IDF weight is determined by the following formulas:

$$TF_{ij} = \log(n_{ij}+1) \tag{1}$$

$$IDF_i = \log\left(\frac{N}{n_i}\right) + 1 \tag{2}$$

$$TFIDF_{ij} = \frac{TF_{ij} * IDF_i}{\sqrt{\sum_{n_j} (TF_{ij} * IDF_i)^2}} \tag{3}$$

where, N=the number of examples in the example base (EB);
$n_i$=the total number of occurrences of term i in the EB;
$n_j$=total term number of the example j;
$n_{ij}$=the total number of occurrences of term i in the example j;
$TF_{ij}$=Term i's normalized frequency in example j; and
$TFIDF_{ij}$=Term i's TFIDF weight in example j.

Such a system is employed in the present invention because the word index can enable efficient example retrieval, and also because it is believed to reflect the factors that should be considered in sentence similarity calculation. Such factors include the number of matched words in each example (the more matched words, the higher the example weight), the differing importance of different words in the example (the higher the term frequency, the lower the term weight), the length of a given example (the longer the example length, the lower the example weight), and the number of extra or mismatched words in the example (the more extra or mismatched words, the less the example weight).

In order to maintain matching information between each term contained in an input sentence and its matched example, the traditional TF/IDF technique is extended to a position-marked TF/IDF format. This reflects not only the term weight, but also the term position in each example. Table 1 shows an exemplary P-TF/IDF indexing file for the terms "anti-virus tool" and "type of".

TABLE 1

Example of P-TFIDF Indexing

| | | | |
|---|---|---|---|
| anti-virus tool | 0.33 | 10245\|0.45\|2_. . . | |
| type of | 0.22 | 100044\|0.30\|2 ^ 12__100074\|0.20\|7_. . . | |

As seen in Table 1, to enhance retrieval speed, one embodiment of the present invention uses bi-term indexing instead of uni-term indexing. In Table 1, the first column shows the bi-term unit indexed. The second column shows the average TF/IDF weight of the bi-term in the example base, and the third column shows the related example's index number, the weight of the bi-term in that example, and the position of the bi-term in the example sentence. For instance, the bi-term "anti-virus tool" has an average TF/IDF weight of 0.33. It can be found in the example identified by index number 102454, etc. The weight of the particular bi-term in the example sentence where it is found is 0.45, and the position of the bi-term in the example sentence is position number 2. The bi-term "type of" can be found twice in example number 100044 at positions 2 and 12. It can also be found in example 100074 at position 7, etc. Thus, example base generator 210 can be any known example base generator generating examples indexed as shown in Table 1. Generator 210 illustratively calculates the TF/IDF weights (or just indexes them if they're already calculated), and it also identifies the position of the bi-term in the example sentence.

Term base 206 is generated by term base generator 214, which also accesses bilingual example corpus 212. Term base generator 214 simply generates correspondences between individual terms in the source and target language.

The overall operation of engine 200 will now be described with respect to FIG. 2, as well as FIG. 3 which is a flow diagram of the overall operation of engine 200. Engine 200 illustratively includes preprocessing component 216, example matching component 218, phrase alignment component 220, translation component 222 and post processing component 224.

Engine 200 first receives the source language input sentence 202 to be translated. This is indicated by block 226 in FIG. 3. Next, preprocessing component 216 performs preprocessing on source language input 202. Preprocessing component 216 illustratively identifies the stemmed forms of words in the source language input 202. Of course, other preprocessing can be performed as well, such as employing part-of-speech tagging or other preprocessing techniques. It should also be noted, however, that the present invention can be employed on surface forms as well and thus preprocessing may not be needed. In any case, preprocessing is indicated by block 228 in FIG. 3.

After preprocessing has been performed, example matching component 218 matches the preprocessed source language input against examples in example base 204. Component 218 also finds all candidate word sequences (or blocks). The best combinations of blocks are then located, as is the best example for each block. This is indicated by blocks 230, 232 and 234 in FIG. 3 and is described in greater detail with respect to FIGS. 4 and 5 below.

The relevant examples 236 for each block are obtained and provided to phrase alignment component 220. The corresponding target language block is then located, and the matched phrases in the source language are replaced with the target language correspondences located. This is indicated by blocks 235 and 238 in FIG. 3. The location of the target language correspondences in this way is performed by phrase alignment component 220 and is illustrated in greater detail with respect to FIGS. 6-10 below.

The source language input may still have a number of terms which failed to be translated through the bi-term matching and the phrase alignment stage. Thus, translation component 222 accesses term base 206 to obtain a translation of the terms which have not yet been translated. Component 222 also replaces the aligned source language phrases with associated portions of the target language examples. This is indicated by block 240 in FIG. 3. The result is then provided to post processing component 224.

Figure 3:
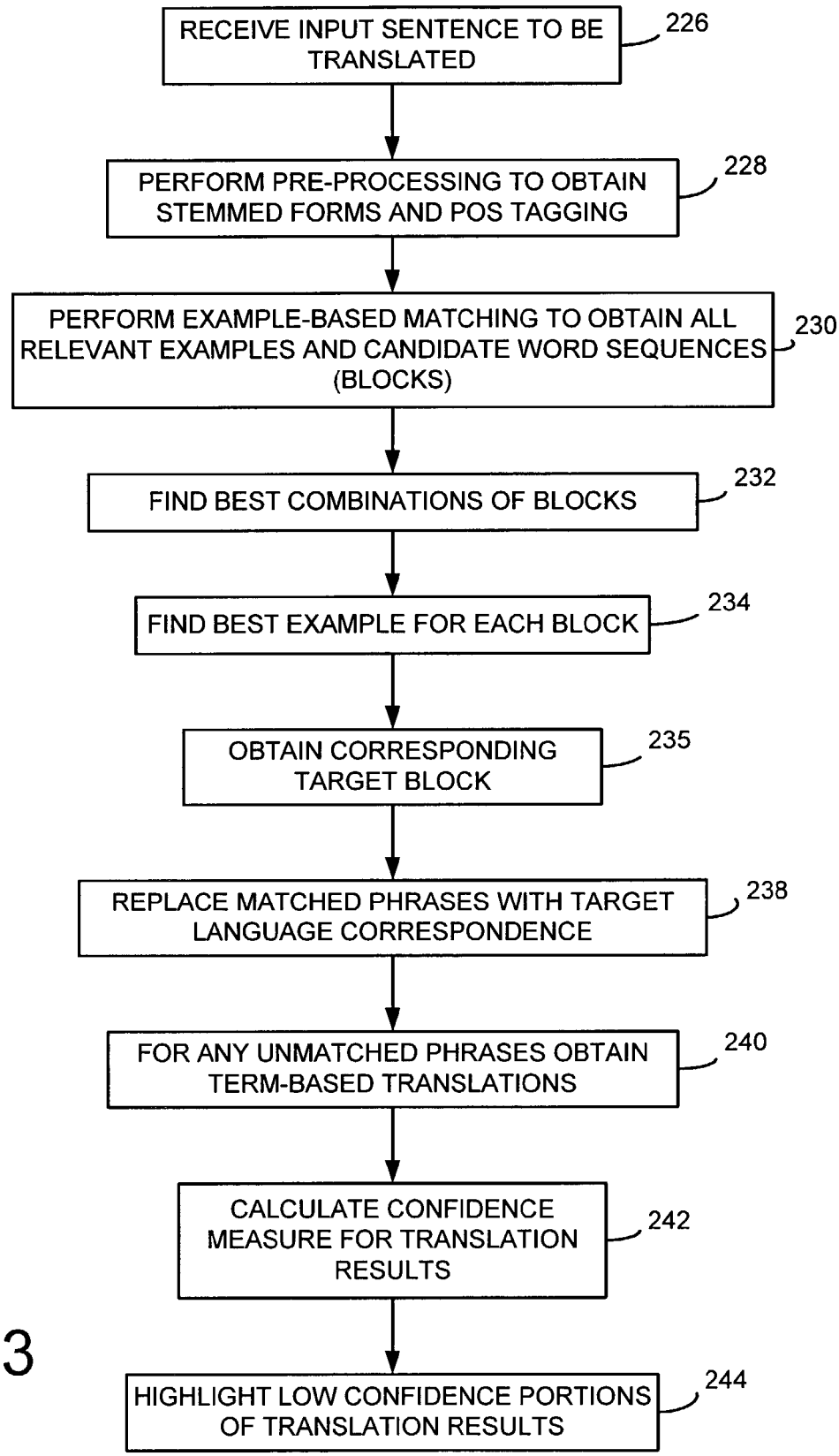
FIG. 3 is a flow diagram illustrating the overall operation of the system shown in FIG. 2.

Post processing component 224 calculates a confidence measure for the translation results as indicated by block 242 in FIG. 3, and can optionally highlight related portions of the translation results that require user's attentions as indicated by block 244. This directs the user's attention to the translation output in related examples which have been calculated, but have a low confidence metric associated with them. Target language output 208 thus illustratively includes the translation result as highlighted to indicate related areas.

Figure 4:
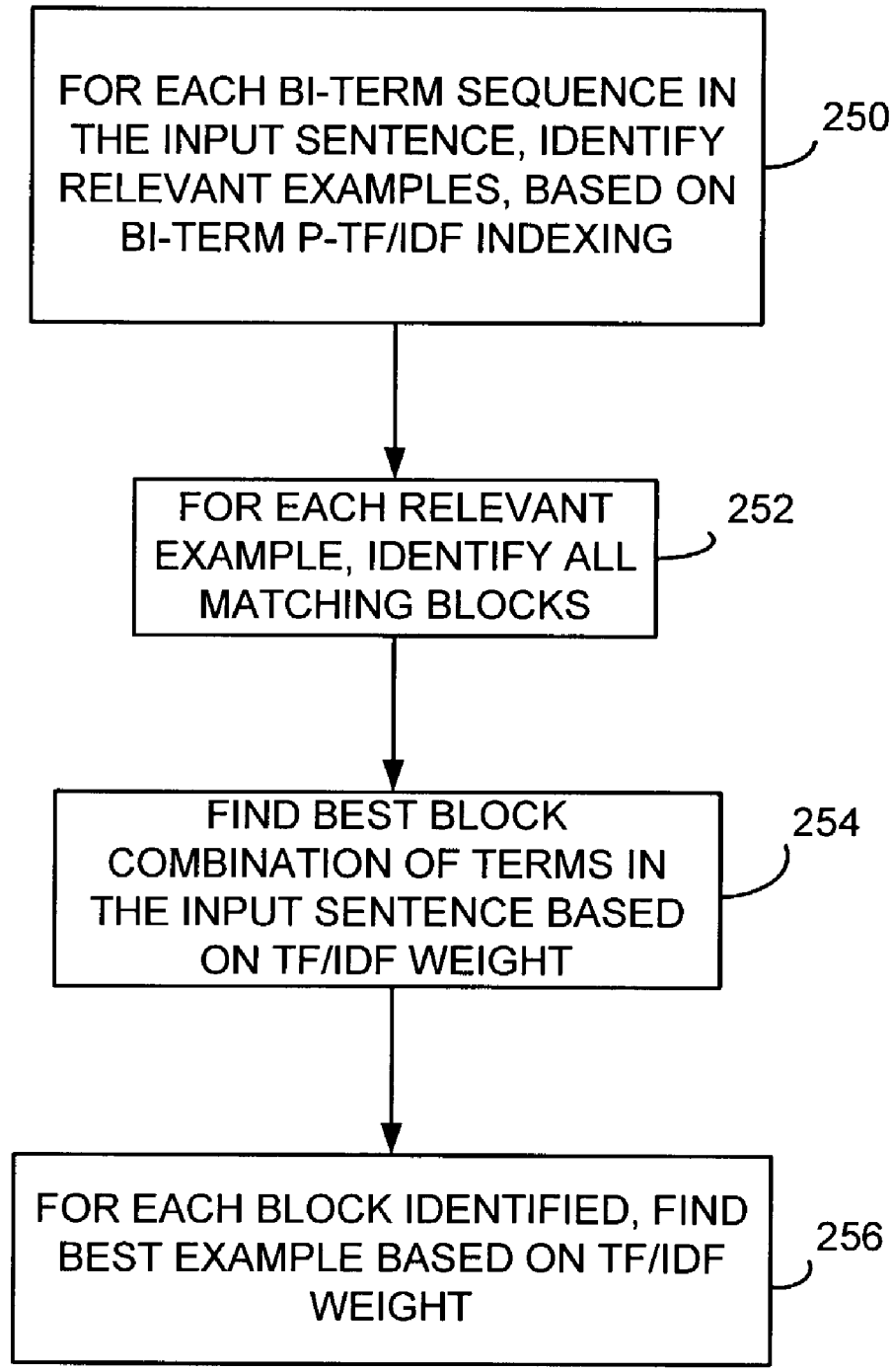
FIG. 4 is a flow diagram illustrating example matching in accordance with one embodiment of the present invention.

FIG. 4 is a flow diagram which better illustrates the operation of example matching component 218. First, all relevant examples are obtained from the example base by accessing the P-TF/IDF index described above. This is illustrated by block 250 in FIG. 4. In order to do this, example matching component 218 simply locates examples which contain the bi-term sequences that are also found in the input sentence. Of course, by accessing the P-TF/IDF index, the identifier of examples containing the bi-term sequence can easily be found (for example, in the third column of Table 1). Then, for each relevant example identified in block 250, all matching blocks between the selected relevant example and the input sentence are identified. This is indicated by block 252.

FIG. 5 better illustrates the meaning of a "matching block". Suppose the input sentence is composed of seven terms (term 1-term 7) each of which is a word in this example. Suppose also that the input sentence contains four indexed bi-terms identified as bi-term 3-4 (which covers terms 3 and 4 in the input sentence) bi-term 4-5 (which covers terms 4 and 5 of the input sentence), bi-term 5-6 (which covers terms 5 and 6 in the input sentence) and bi-term 6-7 (which covers terms 6 and 7 in the input sentence). Now assume that the same continuous sequence of bi-terms occurs in an example (such as example 1 in FIG. 5). Suppose also that the bi-term sequence appears continuous in example 1. Then, the bi-terms in the source language input sentence can be combined into a single block (block 3-7).

However, the matching blocks in the input sentence can overlap one another. For example, it can be seen that example 2 contains a continuous bi-term sequence that can be blocked in the input sentence as block 3-5. Example 3 contains a continuous bi-term sequence that can be blocked in the input sentence as block 5-7. Example 4 contains a continuous bi-term sequence that can be blocked in the input sentence as block 4-5 and example 5 contains a bi-term sequence that can be blocked in the input sentence as block 6-7.

Therefore, a number of different block combinations can be derived. Such block combinations can be block 3-7; block 3-5+block 6-7, block 4-5+block 6-7 or simply block 5-7, etc. The input sentence could be blocked in any of these different ways and still examples can be found for translation of portions of the input sentence. Example matching component 218 thus finds the best block combination of terms in the input sentence by calculating a TF/IDF weight for each block combination. This is indicated by block 254 in FIG. 4.

In accordance with one embodiment of the present invention, the best block combination problem can be viewed as a shortest-path location problem. Thus, a dynamic programming algorithm can be utilized. In accordance with one embodiment of the present invention, the "edge length" (or path length) associated with each block combination is calculated by the following equation:

$$EdgeLen_i = \begin{cases} \dfrac{1}{\sum_{k=m}^{n} TFIDF_k}, & \text{if } n > m \\ 10, & \text{if } n == m \end{cases} \quad (4)$$

where,
i=the "edge" (block) index number in the input sentence;
m=the word indexing number of the "edge" i's starting point;
n=the word indexing number of the "edge" i's ending point;
k=the word indexing number of the "edge" i's each term;
$TFIDF_k$=the term k's average TF/IDF weight in the EB; and
$EdgeLen_i$=weight of block i.

Therefore, each block combination identified has its weight calculated as indicated by the above equation. Thus, each block combination for the input sentence will have a weight or path length associated therewith.

Next, the example associated with each block is identified, and the similarity between each identified example and the input sentence is calculated as follows:

$$similarity_j = \sum_{k=1}^{K} TFIDF_{kj} \quad (5)$$

Where,
K=the total number of common terms included both in example j and the input sentence;
$TFIDF_{kj}$=Term k's TFIDF weight in example j; and
$Similarity_j$=the matching weight between the example j and input sentence.

Finding the TFIDF weight associated with the each example is indicated by block 256 in FIG. 4.

Thus, example matching component 218 has now calculated a score associated with each different block combination into which the input sentence can be divided. Component 218 has also calculated a score for each example associated with every block identified in the different block combinations. Component 218 can then prune the list of examples to those having a sufficient similarity score, or a sufficient similarity score combined with the block combination score, and provide the relevant examples 236 in FIG. 2 to phrase alignment component 220.

It can be seen that phrase alignment component 220 thus accepts as input an example, which in fact is a sentence (or text fragment) pair including a source sentence (or fragment) and a target sentence (or fragment), and also the boundary information specifying the matched portion of the source sentence in that example against the input sentence which is to be translated. Thus, the job of phrase alignment component 220 is to align the possible translations in the target sentence of the given example with the matched phrases or word sequences in the source sentence of the same example, and to select a best target fragment as the translation for that matched part of the source sentence, and therefore as the translation for the matched part (matched between the input sentence to be translated and the source sentence of an example) of the input sentence. In order to do this, phrase alignment component 220 first generates a series of word alignments as anchors in the phrase alignment process.

Based on these anchors, component 220 then attempts to find the correspondent phrases in the target sentence within an example for the matched part of the source sentence in the same example.

Figure 6:
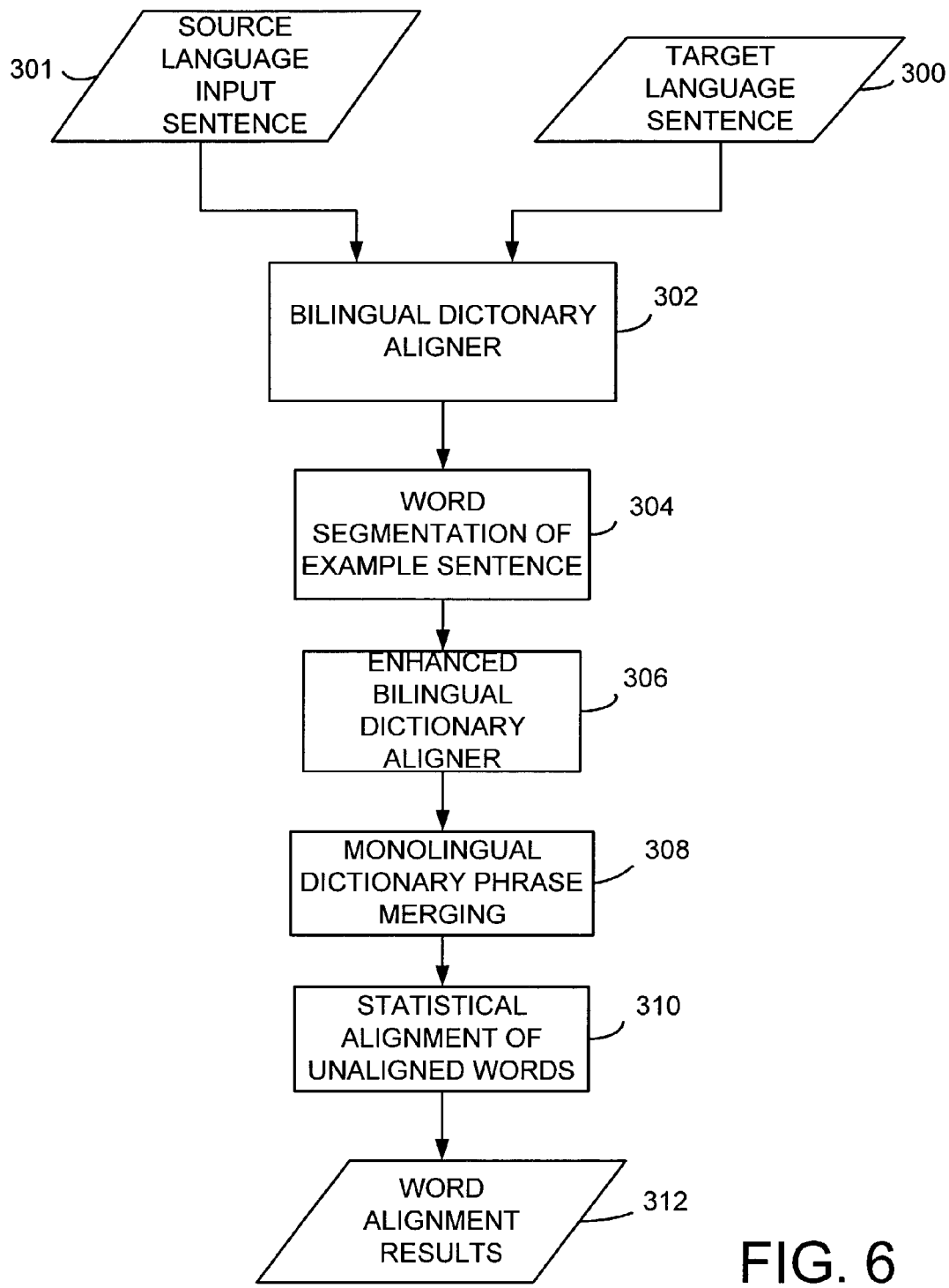
FIG. 6 is a data flow diagram illustrating word alignment in accordance with one embodiment of the present invention.

FIG. 6 is a flow diagram which better illustrates the word alignment process in order to obtain anchors in accordance with one embodiment of the present invention. FIG. 6 shows that in the word alignment process, an example under consideration (which includes source language input sentence 301 and target language sentence 300) is input to a first alignment component which operates as a bilingual dictionary aligner 302. Aligner 302 describes how two words in different languages can possibly be translated into one another. There are a wide variety of different ways in which this has been done. Some metrics for evaluating this type of translation confidence include a translation probability such as that found in Brown et al., *The Mathematics of Statistical Machine Translation: Parameter Estimation*, Computational Linguistics, 19(2), pp. 263-311 (1993), a dice coefficient such as that found in Ker et al., *A Class-based Approach to Word Alignment*, Computational Linguistics Vol. 23, Num. 2, pp. 313-343 (1997), mutual information such as that found in Brown, P. F., *A Statistical Approach to Language Translation*, COLING-88, Vol. 1, pp. 71-76 (1998), and t-score such as that found in Pascale, *A Pattern Matching Method for Finding Noun and Proper Noun Translation From Noisy Parallel Corpora*, Computational Linguistics, 21(4), pp. 226-233 (1995).

Bilingual dictionary aligner 302 thus establishes high confidence single word anchor points which are direct word translations from source sentence to target sentence of example 300. These are used later during phrase alignment.

Next, in cases where the target sentence of example 300 is in a non-segmented language (such as Chinese), word segmentation will be conducted. This can be done in any of a wide variety of different, known ways and the present invention is not limited to any specific word segmentation technique. Word segmentation of the target sentence of the example 300 is indicated by block 304 in FIG. 6.

The enhanced bilingual dictionary based aligner 306 is then employed, which not only utilizes word similarities computed based on a bilingual dictionary, but also uses a distortion model to describe how likely one position in the source sentence can be aligned to another position in the target sentence. As with the bilingual dictionary aligner 302, there are a wide variety of different distortion models which can be employed. Some such models include absolute distortion (such as in Brown, cited above), relative offset (such as in Brown), hidden markoov model (HMM)-based systems and structure constraint systems (also found in Brown).

Even after word alignment and distortion modeling, there will exist some partial alignments. Therefore, a monolingual dictionary is accessed to merge characters into words and words into phrases. This is indicated by block 308 in FIG. 6. In other words, even if the bilingual dictionary is very large, its coverage is still very limited because of the basic complexity of language. Using a monolingual dictionary, some separate words (that should not be separate because they are part of a phrase) can be identified as a phrase. Thus, phrase merging is implemented.

Similarly, any known statistical alignment component can be used in an effort to align unaligned words. This is indicated by block 310. Such statistical alignment techniques are known and are simply provided with a threshold to constrain the statistical alignment space.

Taking all of these items into account, the word alignment results 312 are output by the word alignment system.

While, in the embodiments shown in FIG. 6, the word alignment mechanism includes translation information from bilingual dictionary aligner 302, distortion aligner model 306, phrase merging component 308 and statistical alignment component 310, other sources of information can be used as well. For example, the t-score mentioned above can be used as can contextual information. In any case, the word alignment results 312 provide anchor points which reflect high confidence alignments between the source language sentence 301 and target language sentence 300. These anchor points are used during phrase alignment.

Figure 7:
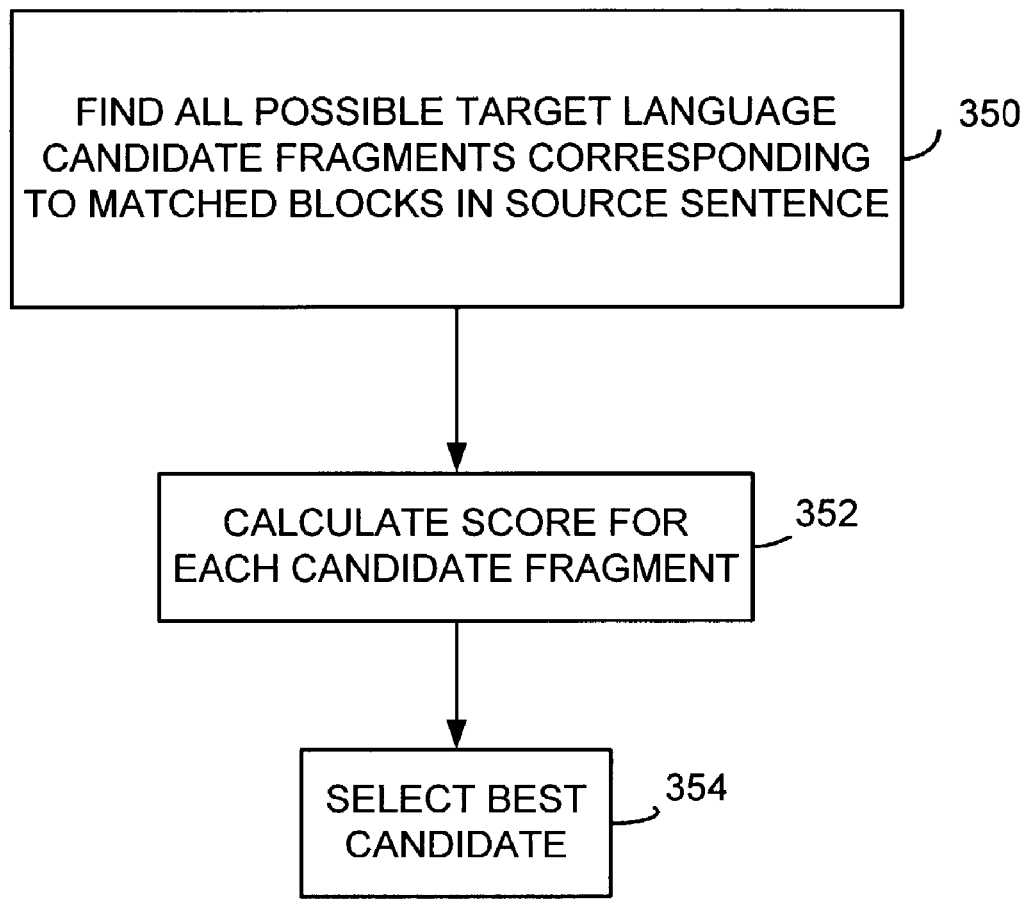
FIG. 7 is a flow diagram illustrating phrase alignment in accordance with one embodiment of the present invention.

FIG. 7 is a flow diagram indicative of one embodiment of phrase alignment in accordance with the present invention. The phrase alignment component receives as an input the word alignment results 312 of the example and the boundary information generated from example matching component 218 identifying the boundaries of matched blocks in the source sentence of an example.

Based on these inputs, the phrase alignment component finds all possible target language candidate fragments corresponding to the matched blocks in the source language sentence. This is indicated by block 350 in FIG. 7. Next, the phrase alignment component calculates a score for each candidate fragment identified. This is indicated by block 352. From the score calculated, the phrase alignment component selects the best candidate or predetermined number of candidates as the translation output. This is indicated by block 354 in FIG. 7.

Figure 8:
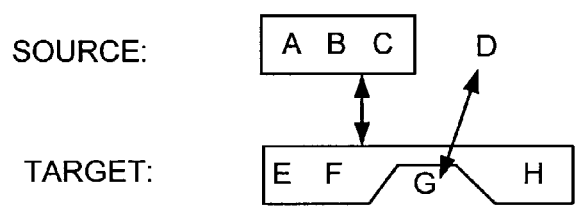
FIGS. 8 and 9 illustrate continuous and discontinuous alignments.
Figure 9:

These steps are now described in greater detail. In finding all possible target language candidate fragments as in step 350, the present invention breaks this task into two parts. The present invention finds all possible continuous candidate fragments, and all possible non-continuous candidate fragments. FIGS. 8 and 9 illustrate continuous and non-continuous fragments.

If a continuous source language sentence fragment always corresponds to a continuous target language fragment, the task of phrase alignment can be easy. However, this is not always true. For example, in languages such as English and Chinese, it is often the case found in FIG. 8. FIG. 8 shows a source language sentence which includes words (or word sequences) A, B, C and D. FIG. 8 also shows a corresponding target language example sentence (or a portion thereof) which includes target language words (or word sequences) E, F, G and H. For purposes of the present discussion, a continuous fragment is defined as follows:

Suppose SFRAG is a fragment in the source language sentence, TFRAG is a fragment in the target language sentence. If all the aligned words in SFRAG are aligned to the words in TFRAG and only to the words in TFRAG, then SFRAG is continuous to TFRAG, and vise versa. Otherwise, it is non-continuous.

In FIG. 8, for example, target language fragment E F G H is not a continuous fragment to fragment A B C. This is because, while A B C is continuous in the source language sentence, E F H, which corresponds to A B C, is not continuous in the target language sentence. Instead, word (or word sequence) G in the target language sentence corresponds to word (or word sequence) D in the source language sentence.

In order to accommodate these difficulties, one embodiment of the present invention breaks the different circumstances into two different categories as shown in FIG. 9. FIG. 9 shows two instances of a source language sentence which contains words (or word sequences) A-F and a target language sentence which contains words (or word sequences) G-N. In the first instance, it can be seen that the English language fragment for which a translation is being sought (C D) corresponds to a continuous target language fragment in the target example illustrated (fragment H I J). This is referred to as continuous.

In the second instance, a continuous source language fragment A B corresponds to a non-continuous target language fragment (G H L M). However, the out of range target language words (or word sequences) I J K also correspond to a continuous source language fragment D E. This is referred to as non-continuous. Thus, the present invention generates all possible continuous fragments and then all possible non-continuous fragments.

Figure 10:
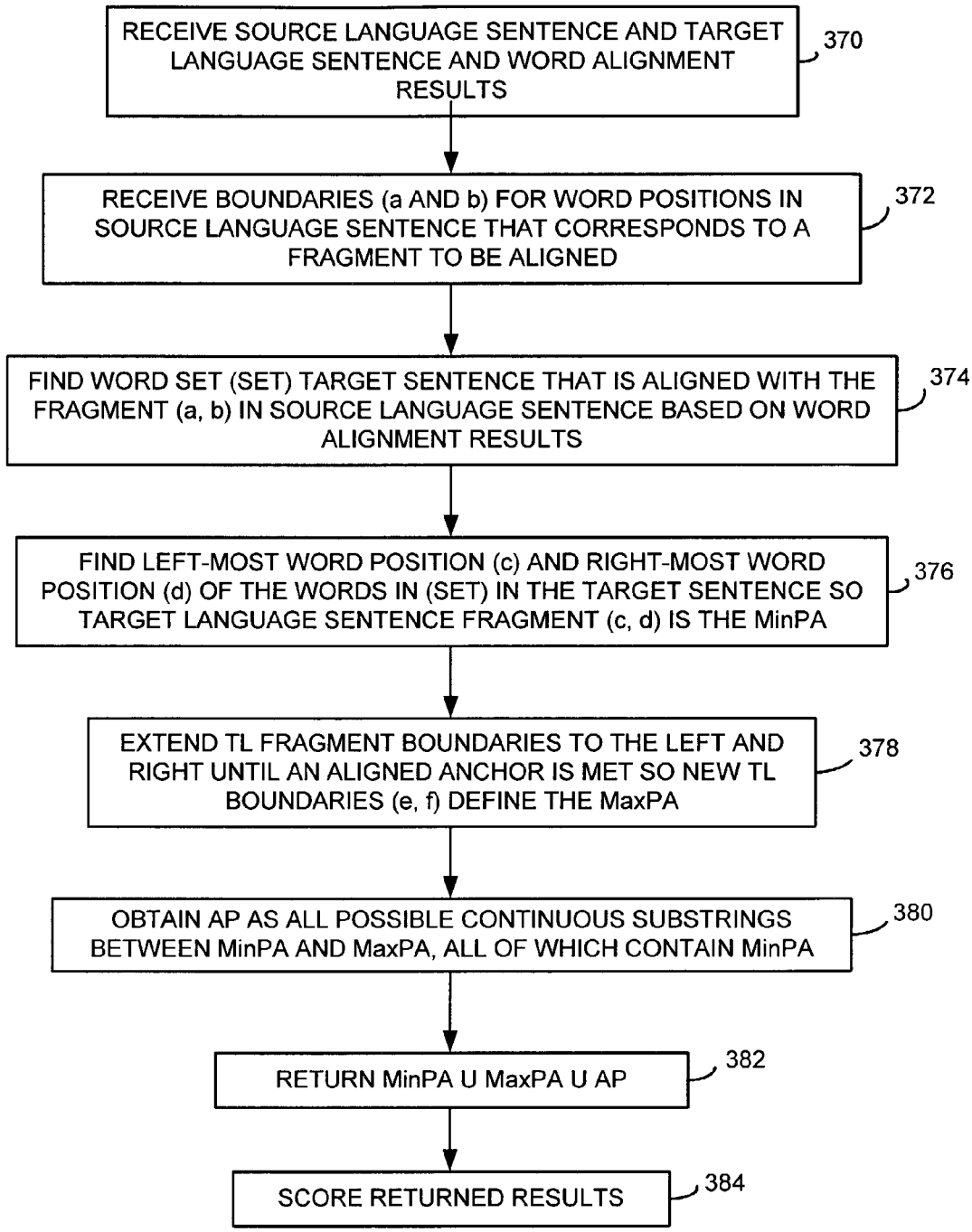
FIG. 10 is a flow diagram illustrating the generation of continuous alignments in accordance with one embodiment of the present invention.

FIG. 10 is a flow diagram illustrating how one embodiment of the present invention in which all possible continuous fragments in the target language sentence are identified for a fragment in the source language sentence. First, the source and target language sentences (or the preprocessed sentences) are received along with word alignment results 312. This is indicated by block 370 in FIG. 10.

Boundary information for the source language fragment for which alignments are sought is also received. The boundary information in the present example is indicated by (a, b) where a and b are word positions in the source language sentence. Thus, if the fragment in the source language sentence for which alignment is sought is C D, in FIG. 9, and each letter is representative of a word, then the boundary information would be (3, 4) since word C is in word position 3 and word D is in word position 4 in the source language sentence. Receiving the boundary information is indicated by block 372 in FIG. 10.

The alignment component then finds a word set (SET) in the target language sentence which aligns to the fragments having boundaries a, b in the source language sentence based on the word alignment results. This is indicated by block 374 in FIG. 10.

The phrase alignment component then finds the left-most word position (c) and the right-most word position (d) of the words in (SET) in the target sentence so the target language sentence fragment (c, d) is the minimum possible alignment (MinPA) in the target language sentence which could be aligned with the source language fragment. This is indicated by block 376. Next, the target language fragment boundaries of MinPA are extended to the left and the right until an inconsistent alignment anchor is met (one which shows alignment to a word in the SL input outside of a, b) in each direction. The left and right boundaries, respectively, are moved by one word within the target language sentence until the left or right boundary (which ever is being moved) meets an inconsistent anchor point. At that point, the extension of the fragment boundary in that direction is terminated. Thus, the new target language boundaries will be (e, f) and will define the maximum possible alignment (MaxPA). This is indicated by block 378.

Next, a set of words AP is obtained. AP is all possible continuous substrings between MinPA and MaxPA, all of which must contain MinPA. By continuous is meant that no word gaps exist within the continuous substring. This is indicated by block 380. The set of MinPA in union with MaxPA in union with AP is then returned as all possible continuous alignments in the target language sentence for the given fragment in the source language sentence. This is indicated by block 382.

All of the continuous alignments are then scored (as is discussed in greater detail below). Scoring the alignments is indicated by block 384. The step of obtaining all possible continuous alignments is performed for each fragment in the source language input.

Figure 11:
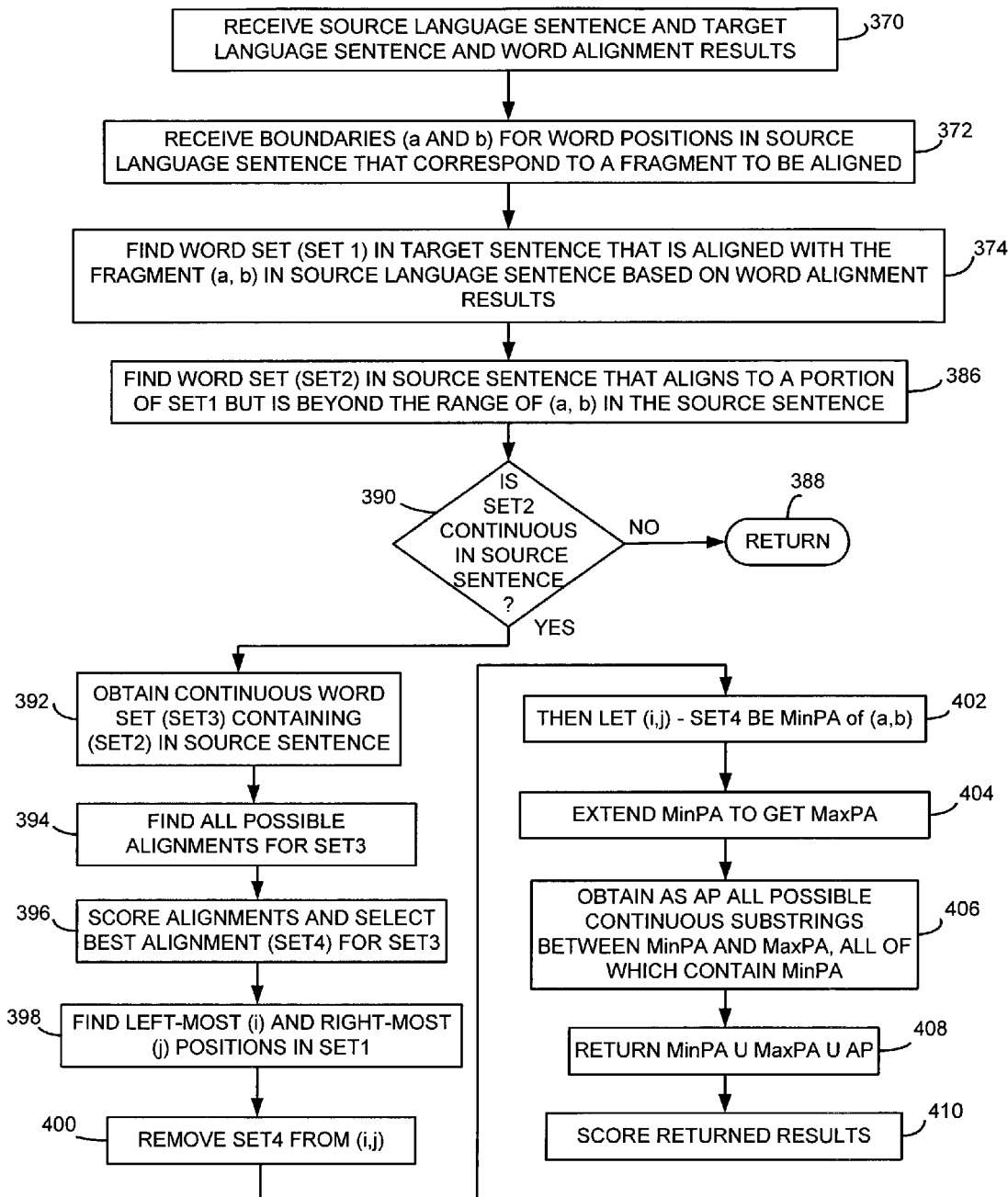
FIG. 11 is a flow diagram illustrating the generation of non-continuous alignments in accordance with one embodiment of the present invention.

FIG. 11 is a flow diagram illustrating how all possible non-continuous alignments are found. Again, by non-continuous alignments it is meant those such as found in FIG. 8 and the second instance of FIG. 9 in which a continuous source fragment corresponds to a non-continuous target fragment.

In order to obtain all possible continuous fragments, the phrase alignment component first receives the inputs and boundaries as described with respect to blocks 370 and 372 in FIG. 10. Next, the system finds a word set (SET1) in the example (or target) sentence that is aligned with the selected fragment (a, b) in the source language sentence based on the word alignment results. This is the same as indicated by block 374 in FIG. 10.

Next, the phrase alignment component finds a word set (SET2) in the source sentence that aligns to a portion of SET1 but is beyond of the range of (a, b) in the source language sentence. This is indicated by block 386 in FIG. 11.

It is next determined whether SET2 is continuous in the source language sentence. If not, no phrase alignments are calculated. This is indicated by blocks 388 and 390. However, if SET2 is continuous in the source language sentence (meaning that there are no word gaps in SET2), then processing continues at block 392.

In block 392, the phrase alignment component obtains the continuous word set (SET3) containing SET2 in the source language sentence. Next, all possible alignments for SET3 are obtained. This is illustratively done using the algorithm described with respect to FIG. 10. Finding all possible alignments for SET3 is indicated by block 394 in FIG. 11.

All of the alignments are then scored and the best alignment SET4 for SET3 is chosen. This is indicated by block 396.

The left most position (i) and the right most position (j) in SET are then located. This is indicated by block 398. SET4 is then removed from the sequence (i, j). This is indicated by block 400.

Then, the word sequence (i, j) minus SET4 is identified as MinPA of (a, b). This is indicated by block 402.

MinPA is then extended to obtain MaxPA as discussed with respect to block 378 in FIG. 10. This is indicated by block 404 in FIG. 11.

Again, AP is obtained as all possible continuous substrings between MinPA and MaxPA, all of which contain MinPA. This is indicated by block 406 in FIG. 11. The union of MinPA, MaxPA and AP is then returned as indicated by block 408. Each of the possible non-continuos alignments returned is then scored as indicated by block 410.

In accordance with one embodiment of the present invention, the score associated with each of the possible alignments is indicated by the following equation:

$$\text{Weight} = P(m|l) P(\Delta k | m\ l) P(\Delta j | m\ l) \quad (6)$$

Where,
   m=the length of the SL fragment;
   l=the length of the TL fragment;
   k=the number of content words in SL sentence;
   j=the number of functional words in SL sentence;
   $\Delta j = l j$ of TL$-j$ of SL|; and
   $\Delta k = |k$ of TL$-k$ of SL|.

However, other scoring techniques could be used as well.

Finally, after replacing the source language words and phrases with the aligned target language words and phrases, the confidence level for each translation output is calculated. This can be done by translation component 222 or post processing component 224 in system 200. In any case, in one embodiment, the translation confidence level is determined as follows:

$$ConL = c_1 \times \log(AlignCon \times 10) + c_2 \times \log(TransPercent \times 10) + \quad (7)$$
$$c_3 \times \log(10/\text{Example\_num}) + c_4 \times \log(10/\text{Valid\_block\_num})$$

$$AlignCon = \sum_{\substack{w_i \in PhrSL, w_j \in PhrTL \\ i...j: \text{are connected}}} Conf(C_{ij}) / |PhrTL| \quad (8)$$

$$(0 \le AlignCon \le 1,\ 0 \le TransPercent \le 1,\ \sum_{i=1}^{4} c_i = 1)$$

where,
   ConL: translation confidence level;
   $c_1, c_2, \ldots, c_4$: constants,
   AlignCon: alignment confidence level;
   TransPercent: weighted translation percentage;
   Example$_{13}$ num: employed example number;
   Valid$_{13}$ block$_{13}$ num: fragment number in input string translation;
   PhrSL: the SL phrase in example that related to the given input string;
   PhrTL: the TL correspondence in the translation of the example;
   |PhrTL|: the word number of PhrTL;
   $C_{i\ j}$: connection between SL word i and TL word j; and
   Conf($C_{i\ j}$): confidence level of word alignment.

Thus, the translation confidence level is based on the alignment confidence level, the confidence of aligned words, and the number of aligned and unaligned words in the target language correspondence. The system marks portions of the output with the confidence level which allows the user to identify low confidence translation outputs for particular scrutiny and the areas that require user's attention.

It can thus be seen that the present invention employs an example matching method that enhances the example matching and retrieval performance both in quality and speed over prior systems. Similarly, the present invention employs a word/phrase alignment technique and a score function for selecting the best candidate in phrase alignment which also produces enhancements in accuracy and speed over prior systems. Finally, the present invention employs a translation confidence prediction method that indicates the quality of the translation generated by the machine, and also highlights some translation portions for scrutiny by the user.

Although the present invention has been described with reference to particular embodiments, workers skilled in the art will recognize that changes may be made in form and detail without departing from the spirit and scope of the invention.

What is claimed is:
1. A method of performing machine translation of a source language (SL) input to a translation output in a target language (TL), comprising:
   matching fragments of the SL input to SL fragments of examples in an example base;
   identifying all matched blocks in the SL input as blocks of terms in the SL input that are matched by one or more SL fragments in an example;
   selecting block combinations of the matched blocks to cover one or more fragments of the SL input;
   for each block in the selected block combinations, identifying an example associated with the block;

aligning TL portions of the identified example with SL portions of the identified example that match the one or more fragments of the SL input; and providing the translation output based on the aligned portions wherein identifying an example associated with a block comprises:

calculating a block score corresponding to each example containing the block by calculating the block score as follows:

$$similarity_j = \sum_{k=1}^{K} TFIDF_{kj}$$

Where,

TFIDF is term frequency inverse document frequency:

K=a total number of common terms included both in example j and the SL input;

$TFIDF_{kj}$=Term k's TF/IDF weight in example j; and $Similarity_j$=matching weight between the example j and the SL input; and identifying the example associated with the block based on the block score.

2. The method of claim 1 wherein providing the translation output comprises:
outputting a plurality of possible translation outputs.

3. The method of claim 2 and further comprising:
calculating a confidence measure for each translation output.

4. The method of claim 3 wherein calculating comprises:
calculating the confidence measure as a translation confidence level as follows:

$$ConL = c_1 \times \log(AlignCon \times 10) + c_2 \times \log(TransPercent \times 10) + c_3 \times \log(10/Example\_num) + c_4 \times \log(10/Valid\_block\_num)$$

$$AlignCon = \sum_{\substack{w_i \in PhrSL, w_j \in PhrTL \\ i...j: are\ connected}} Conf(C_{ij})/|PhrTL|$$

$$(0 \leq AlignCon \leq 1, 0 \leq TransPercent \leq 1, \sum_{i=1}^{4} c_i = 1)$$

where,

ConL: is the translation confidence level;

$c_1, c_2, \ldots, c_4$: are constants,

AlignCon: is an alignment confidence level;

TransPercent: is a weighted translation percentage;

$Example_{13}num$: is an employed example number identifying the identified example;

$Valid_{13}block_{13}num$: is a fragment number in a possible TL Translation under consideration;

PhrSL: is a SL phrase that relates to a given input string;

PhrTL: is a TL correspondence in the possible translation of the SL input;

|PhrTL|: is a word number of PhrTL;

$C_i \ldots _j$: is a connection between SL word i and TL word j; and $Conf(C_i \ldots _j)$: is the translation confidence level of word Alignment.

5. The method of claim 3 and further comprising:
identifying portions of the translation output that require a user's attention.

6. The method of claim 1 wherein matching fragments of the SL input to fragments of examples comprises:
identifying bi-terms in the SL input; and
accessing a bi-term index of the example base that includes example identifiers identifying examples that contain indexed bi-terms.

7. The method of claim 6 wherein accessing a bi-term index comprises:
accessing a bi-term index of the example base that includes word position information indicative of a word position in the example where the bi-term resides.

8. The method of claim 7 wherein accessing a bi-term index comprises:
accessing a bi-term index of the example base that includes a score indicative of a term frequency/inverse document frequency (TF/IDF) score for the bi-term in the example.

9. The method of claim 8 wherein accessing a bi-term index comprises:
accessing a bi-term index of the example base that includes a corpus score indicative of a representative TF/IDF score for the bi-term across the example base.

10. The method of claim 1 wherein aligning TL portions of the example with the SL portions comprises:
performing word alignment to identify anchor alignment points between the SL portion and the TL portion of the example;
finding all continuous alignments between the TL portion and the SL portion based on the anchor alignment points; and
finding all non-continuous alignments between the TL portion and the SL portion based on the anchor alignment points.

11. The method of claim 1 wherein selecting block combinations comprises:
calculating a block combination score for different combinations of the identified blocks; and
identifying N best block combinations based on the block combination scores.

12. The method of claim 11 wherein calculating a block combination score comprises:

$$EdgeLen_i = \begin{cases} \dfrac{1}{\sum_{k=m}^{n} TFIDF_k}, & \text{if } n > m \\ 10, & \text{if } n == m \end{cases}$$

where, i=an "edge"(block) index number in the SL input;

m=a word indexing number of the "edge" i's starting point;

n=a word indexing number of the "edge" i's ending point;

k=a word indexing number of the "edge" i's each term;

$TFIDF_k$=term k's average TF/IDF weight in the example base; and $EdgeLen_i$=a weight of block i.

13. A method of performing machine translation of a source language (SL) input to a translation output in a target language (TL), comprising:
matching fragments of the SL input to SL fragments of examples in an example base;
identifying all matched blocks in the SL input as blocks of terms in the SL input that are matched by one or more SL fragments in an example;

selecting block combinations of the matched blocks to cover one or more fragments of the SL input;

for each block in the selected block combinations calculating a block score corresponding to each example containing the block, and, identifying an example associated with the block based on the block score;

aligning TL portions of the identified example with SL portions of the identified example that match the one or more fragments of the SL input;

providing the translation output as a plurality of possible translation outputs based on the aligned portions; and calculating a confidence measure for each translation output, as a translation confidence level, as follows:

$$ConL = c_1 \times \log(AlignCon \times 10) + c_2 \times \log(TransPercent \times 10) + c_3 \times \log(10/Example\_num) + c_4 \times \log(10/Valid\_block\_num)$$

$$AlignCon = \sum_{\substack{w_i \in PhrSL, w_j \in PhrTL \\ i...j: are\ connected}} Conf(C_{ij})/|PhrTL|$$

$$(0 \le AlignCon \le 1,\ 0 \le TransPercent \le 1,\ \sum_{i=1}^{4} c_i = 1)$$

where,

ConL: is the translation confidence level;

$c_1, c_2, \ldots, c_4$: are constants,

AlignCon: is an alignment confidence level;

TransPercent: is a weighted translation percentage;

Example_num: is an employed example number identifying the identified example;

Valid_block_num: is a fragment number in a possible TL Translation under consideration;

PhrSL: is a SL phrase that relates to a given input string;

PhrTL: is a TL correspondence in the possible translation of the SL input;

|PhrTL|: is a word number of PhrTL;

$C_i \ldots_j$: is a connection between SL word i and TL word j; and $Conf(C_i \ldots_j)$: is the translation confidence level of word Alignment.

14. The method of claim 13 and further comprising:
identifying portions of the translation output that require a user's attention.

15. The method of claim 13 wherein matching fragments of the SL input to fragments of examples comprises:
identifying bi-terms in the SL input; and
accessing a bi-term index of the example base that includes example identifiers identifying examples that contain indexed bi-terms.

16. The method of claim 15 wherein accessing a bi-term index comprises:

accessing a bi-term index of the example base that includes word position information indicative of a word position in the example where the bi-term resides.

17. The method of claim 16 wherein accessing a bi-term index comprises:

accessing a bi-term index of the example base that includes a score indicative of a term frequency/inverse document frequency (TF/IDF) score for the bi-term in the example.

18. The method of claim 17 wherein accessing a bi-term index comprises:

accessing a bi-term index of the example base that includes a corpus score indicative of a representative TF/IDF score for the bi-term across the example base.

19. The method of claim 13 wherein aligning TL portions of the example with the SL portions comprises:

performing word alignment to identify anchor alignment points between the SL portion and the TL portion of the example;

finding all continuous alignments between the TL portion and the SL portion based on the anchor alignment points; and finding all non-continuous alignments between the TL portion and the SL portion based on the anchor alignment points.

20. The method of claim 13 wherein selecting block combinations comprises:

calculating a block combination score for different combinations of the identified blocks; and identifying N best block combinations based on the block combination scores.

21. The method of claim 20 wherein calculating a block combination score comprises:

$$EdgeLen_i = \begin{cases} \dfrac{1}{\sum_{k=m}^{n} TFIDF_k}, & \text{if } n > m \\ 10, & \text{if } n == m \end{cases}$$

where, i = an "edge"(block) index number in the SL input;

m = a word indexing number of the "edge" i's starting point;

n = a word indexing number of the "edge" i's ending point;

k = a word indexing number of the "edge" i's each term;

$TFIDF_k$ = term k's average TF/IDF weight in the example base; and $EdgeLen_i$ = a weight of block i.

* * * * *

UNITED STATES PATENT AND TRADEMARK OFFICE
CERTIFICATE OF CORRECTION

PATENT NO. : 7,353,165 B2  Page 1 of 1
APPLICATION NO. : 10/185376
DATED : April 1, 2008
INVENTOR(S) : Ming Zhou et al.

It is certified that error appears in the above-identified patent and that said Letters Patent is hereby corrected as shown below:

In column 15, line 53, in Claim 4, delete "Example$_{13}$ num:" and insert -- Example_num: --, therefor.

In column 15, line 55, in Claim 4, delete "Valid$_{13}$ block$_{13}$ num:" and insert -- Valid_block_num: --, therefor.

In column 17, line 31, in Claim 13, delete "Example$_{13}$ num:" and insert -- Example_num: --, therefor.

In column 17, line 33, in Claim 13, delete "Valid$_{13}$ block$_{13}$ num:" and insert -- Valid_block_num: --, therefor.

Signed and Sealed this

Twenty-second Day of February, 2011

David J. Kappos
*Director of the United States Patent and Trademark Office*